United States Patent
Åsbogård et al.

(10) Patent No.: US 9,738,282 B2
(45) Date of Patent: Aug. 22, 2017

(54) METHOD FOR IMPROVING STARTABILITY OF A VEHICLE

(71) Applicant: VOLVO TRUCK CORPORATION, Göteborg (SE)

(72) Inventors: Mattias Åsbogård, Mölnlycke (SE); Johan Bringhed, Västra Frölunda (SE); Niclas Wennberg, Göteborg (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 14/766,765

(22) PCT Filed: Feb. 11, 2013

(86) PCT No.: PCT/EP2013/000399
§ 371 (c)(1),
(2) Date: Aug. 10, 2015

(87) PCT Pub. No.: WO2014/121808
PCT Pub. Date: Aug. 14, 2014

(65) Prior Publication Data
US 2016/0001778 A1      Jan. 7, 2016

(51) Int. Cl.
*G06F 19/00* (2011.01)
*B60W 30/18* (2012.01)
(Continued)

(52) U.S. Cl.
CPC ....... *B60W 30/18018* (2013.01); *B60K 6/105* (2013.01); *B60W 10/06* (2013.01);
(Continued)

(58) Field of Classification Search
USPC .......................................................... 701/99
See application file for complete search history.

(56) References Cited

U.S. PATENT DOCUMENTS

| 5,841,201 A * | 11/1998 | Tabata | B60K 6/365 180/65.25 |
| 6,203,468 B1 * | 3/2001 | Nitta | B60W 10/02 477/107 |

(Continued)

FOREIGN PATENT DOCUMENTS

| CN | 1134765 A | 10/1996 |
| CN | 1524725 A | 9/2004 |

(Continued)

OTHER PUBLICATIONS

International Search Report (Oct. 13, 2013) for corresponding International App. PCT/EP2013/000399.

(Continued)

*Primary Examiner* — Hussein A. Elchanti
(74) *Attorney, Agent, or Firm* — WRB-IP LLP

(57) ABSTRACT

A method for improving startability of a vehicle is provided, the vehicle being provided with a prime mover and a kinetic energy recuperation system. The prime mover is adapted to propel the vehicle either alone or in combination with the kinetic energy recuperation system which is operably coupled to the prime mover and to wheels of the vehicle and is adapted to store energy at times when there is an abundance of energy and to use energy at times when there is a demand for energy. A vehicle is also provided. The method includes determining that the vehicle is standing still or essentially standing still; detecting a take-off assistance condition; detecting a level of energy in the kinetic energy recuperation system; if the level of energy is found insufficient, connecting the prime mover to the kinetic energy recuperation system and running the prime mover such that energy from the prime mover is stored in the kinetic energy recuperation system; and when a driver requests the vehicle to take off, running the prime mover and consuming energy (Continued)

from the kinetic energy recuperation system such that the wheels of the vehicle initiate propelling thereof.

14 Claims, 2 Drawing Sheets

(51) Int. Cl.
  *B60K 6/10* (2006.01)
  *B60W 10/06* (2006.01)
  *B60W 10/24* (2006.01)
(52) U.S. Cl.
  CPC ...... *B60W 10/24* (2013.01); *B60W 30/18027* (2013.01); *B60W 30/18054* (2013.01); *B60W 2520/04* (2013.01); *B60W 2530/10* (2013.01); *B60W 2550/142* (2013.01); *Y02T 10/6204* (2013.01); *Y02T 10/92* (2013.01)

(56) References Cited

U.S. PATENT DOCUMENTS

| | | | | |
|---|---|---|---|---|
| 6,480,767 | B2* | 11/2002 | Yamaguchi | B60K 6/46 180/165 |
| 7,131,510 | B2* | 11/2006 | Mesiti | B60K 6/48 180/65.25 |
| 7,351,265 | B2* | 4/2008 | Vitale | B60K 6/38 180/65.51 |
| 7,823,670 | B2* | 11/2010 | Noiret | B60K 6/26 180/65.28 |
| 7,891,450 | B2* | 2/2011 | Soliman | B60K 6/48 180/65.265 |
| 2006/0048516 | A1* | 3/2006 | Tenbrock | B60K 6/48 60/698 |
| 2007/0068714 | A1* | 3/2007 | Bender | B60K 6/28 180/65.29 |
| 2007/0265749 | A1* | 11/2007 | Fitzgibbons | B60G 17/0195 701/37 |
| 2008/0059035 | A1* | 3/2008 | Siddiqui | B60K 6/445 701/93 |
| 2008/0125928 | A1* | 5/2008 | Conlon | B60K 6/365 701/22 |
| 2008/0223635 | A1* | 9/2008 | Noiret | B60K 6/26 180/65.265 |
| 2008/0300743 | A1* | 12/2008 | Conlon | B60K 6/40 701/22 |
| 2010/0280712 | A1 | 11/2010 | Bowman | |
| 2011/0320083 | A1* | 12/2011 | Nishimura | B60K 6/445 701/22 |
| 2012/0029745 | A1 | 2/2012 | Miyao | |
| 2013/0217539 | A1* | 8/2013 | Natsume | B60K 6/48 477/52 |
| 2014/0371964 | A1* | 12/2014 | Kitahata | B60K 6/445 701/22 |
| 2015/0080173 | A1* | 3/2015 | Hayashi | B60K 6/445 477/4 |
| 2015/0087457 | A1* | 3/2015 | Hayashi | B60K 6/365 475/2 |
| 2015/0087474 | A1* | 3/2015 | Matsubara | B60W 20/108 477/3 |

FOREIGN PATENT DOCUMENTS

| | | | |
|---|---|---|---|
| CN | 1931621 A | 3/2007 | |
| CN | 201120841 Y | 9/2008 | |
| EP | 2 110 289 A2 | 10/2009 | |
| JP | WO2013038481 | * 3/2013 | ............ B60K 6/36 |
| WO | 2004/000595 A1 | 12/2003 | |
| WO | 2007/138353 A1 | 12/2007 | |
| WO | 2012/159686 A1 | 11/2012 | |

OTHER PUBLICATIONS

International Preliminary Report on Patentability (Feb. 2, 2015) for corresponding International App. PCT/EP2013/000399.
Chinese Official Action (dated Apr. 5, 2017) for corresponding Chinese App. 201380072686.9.

* cited by examiner

METHOD FOR IMPROVING STARTABILITY OF A VEHICLE

BACKGROUND AND SUMMARY

The present disclosure relates to a method fir improving startability of a vehicle, said vehicle being provided with a prime mover and a kinetic energy recuperation system. The prime mover is adapted to propel the vehicle either alone or in combination with the kinetic energy recuperation system which is operably coupled to the prime mover and to wheels of the vehicle and is adapted to store energy at times when there is an abundance of energy and to consume energy at times when there is a demand for energy. The pre-sent disclosure also relates to a vehicle which utilises the method according to the invention.

In the automotive industry the general trend is and has been to reduce fuel consumption end exhaust gas emissions in the vehicles, especially in commercial vehicles having internal combustion engines. This may be achieved in many different ways. One strategy has been to reduce the engine size in general. However there may be times when such a downsized engine is not sufficient to deliver the required torque to propel the vehicle. Especially when the vehicle, such as a commercial vehicle in cargo traffic or a construction type of vehicle, is heavily loaded. In combination with a downsized engine also a secondary and further assistance motor(s) can be implemented, which is (are) adapted to assist the main engine at times when the power demand delivered by the main engine is insufficient.

For vehicles running on frequent stall/stop cycles, enough torque must be delivered from the engine or system of engines to achieve proper startability. It should be noted in this regard that "startability" is meant as the take-off of the vehicle from a general standstill, not that the engine or system of engines is started up for the first time, such that the engine or system of engines is cold when started. When downsizing an engine to reduce fuel consumption or reduce exhaust gas emissions, the downsizing cannot be made to such extents that take-off from a standstill or acceleration on a general basis is impaired unless secondary assistance propulsion systems are provided.

Using Automated Mechanical Transmissions (AMT) instead of traditional Automatic Transmissions (AT) can also save fuel in a city bus, local distribution and refuse truck applications. To keep weight, cost and size of the transmission low, it is an advantage if an AMT with a narrow ratio coverage and a low number of gears can be used. However, an AMT would normally not have a torque converter, as is the case for an AT, and in combination with a narrow ratio coverage it can lead to poor startability from a standstill of the vehicle. However, not only an AMT with for example only six gears, but any type of transmission having a narrow ratio coverage between the lowest and the highest gear might suffer from poor startability.

One way to complement a downsized internal combustion engine may be to utilize for example a flywheel which is loaded with kinetic energy when braking the vehicle. This energy may later be consumed as support for the engine when the vehicle needs extra propulsion, such as when taking over another vehicle or starting from a standstill. In this respect a flywheel gives little energy at a high power which means that it is quickly loaded but also as quickly unloaded. This is in general terms the opposite situation as for a battery.

US 2010/0280712 discloses a vehicle being provided with a flywheel in combination with an internal combustion engine. The vehicle engine is supported by the flywheel at times when extra torque is needed. In a first mode the vehicle is cruising and the flywheel has not yet been started. When the driver of the vehicle demands a deceleration, this deceleration is used to charge the flywheel. The energy in the flywheel may later be consumed to support the internal combustion engine for propulsion of the vehicle. In a start-up mode, when the engine is cold, the internal combustion engine is run together with the flywheel in order to warm up the internal combustion engine quicker, which improves the exhaust gas after-treatment efficiency more rapidly. As a result, exhaust gas emissions are more rapidly reduced. The energy thus stored in the flywheel may later again support the internal combustion engine for propulsion of the vehicle.

It is desirable to further improve the startability of a vehicle, especially of a vehicle in which a prime mover has been supplemented with a kinetic energy recuperation system for the possibility to reduce the size of the prime mover.

According to a first aspect a method is disclosed for improving startability of a vehicle, said vehicle being provided with a prime mover and a kinetic energy recuperation system. Said prime mover is adapted to propel the vehicle either alone or in combination with the kinetic energy recuperation system which is operably coupled to the prime mover and to wheels of the vehicle and is adapted to store energy at times when there is an abundance of energy and to consume energy at times when there is a demand for energy. The method comprises the steps of:

- determining that the vehicle is standing still or essentially standing still,
- detecting a take-off assistance condition,
- detecting a level of energy in the kinetic energy recuperation system,
- if the level of energy is found insufficient, connecting the prime mover to the kinetic energy recuperation system and running the prime over such that energy from the prime mover is stored in the kinetic energy recuperation system, and
- when the driver requests the vehicle to take off, running the prime mover and consuming energy from the kinetic energy recuperation system such that the wheels of the vehicle initiate propelling thereof.

The method safeguards that there is enough energy in the in kinetic energy recuperation system for a proper take-off from a standstill condition. This safeguard aspect is particularly relevant for vehicles such as city busses or refuse trucks which drive many hours a day, and often take off from a shorter or longer standstill. A standstill of the kind relevant, for the inventive method may include for instance when the vehicle, such as a passenger bus in regular city traffic, regularly is stopping at bus stops to let people on and off. The time standing still at the bus stop is generally rather short in the sense that although the bus may be provided with a start/stop function, the engine and exhaust gas system are generally still warm enough to still be efficient and to produce low emission levels when again starting the engine to drive away, i.e. to take off from the bus stop. A method of the kind defined is particularly advantageous for a vehicle having a downsized engine, but may well be utilized in combination with any type of engine. The method thus improves the startability of the vehicle, enabling, smooth interaction with the surrounding traffic, as well as increased life-length of the transmission clutch. By the expression "to consume energy" is meant the reuse of energy that earlier has been stored in the kinetic energy recuperation system.

According, to one embodiment, the step of finding the level of energy insufficient involves finding that the level of energy is lower than a first predetermined energy value.

The kinetic energy recuperation system may be loaded to the level of a first predetermined energy value, which first predetermined energy value is chosen such that the vehicle may take off smoothly at most occasions. The first predetermined energy value need not represent maximum loading. The first predetermined, energy value ma either be a fixed value, or be adapted to each particular take-off. Hereby a flexible system may be achieved.

According to one embodiment, if the level of energy is lower than said first predetermined energy value, the method further includes detecting whether the prime mover is running, and if it is not, starting up the prime mover.

This is particularly relevant if the vehicle is provided with a start/stop function. It also comes into effect if the prime mover for some other reason has been stopped.

According to one embodiment the vehicle is provided with a start/stop function, such that if a take-off assistance condition is detected and if the vehicle is standing still or essentially standing still, said start-stop function is disabled from stopping the prime mover from running.

This way the method is able to quickly ensure that the kinetic energy recuperation system is stored with energy such that the vehicle is ready to take off quickly.

According to one embodiment of the invention the steps are performed in the order mentioned.

According to one embodiment the step of determining a take-off assistance condition includes any one or a combination of the following: determining that the vehicle is standing in or at an upward slope, determining that the vehicle is heavily loaded, or determining that the vehicle is being belated in relation to a desired schedule.

According to one embodiment the step of determining that the vehicle is standing in or at an upward slope involves using inclination detecting means and determining if the inclination detecting means detect an upwards slope being equal to or greater than a predetermined inclination value.

Such inclination detecting means may include an inclination sensor located in the vehicle, a vehicle navigation system such as a Global Positioning System (GPS) having also information of altitudes included, or a vehicle navigation system such as a GPS system which is adapted to record the altitude of a position if the vehicle passes said location in order to use the altitude information the next time the same location is passed.

According to one embodiment said predetermined inclination value corresponds to an upward slope of 7.5%, preferably of 10%, and more preferably of 12.5%.

According to one embodiment the step of determining that the vehicle is heavily loaded involves weight sensing means and determining that the weight sensing means detect a payload in the vehicle being equal or greater than a predetermined weight value.

Such weight sensing means may include gauges of different kinds located in or at a vehicle suspension system, such that the additional payload on the suspension system may be estimated in relation to the vehicle dead weight.

According to one embodiment said predetermined weight value corresponds to a payload of 30%, preferably of 50%, and more preferably of 70% in relation to a vehicle dead weight.

According, to one embodiment the method further comprises prohibiting propelling the vehicle until the level of energy in the kinetic energy recuperation system is equal to or greater than a second predetermined energy value.

In such a case the kinetic energy recuperation system should be loaded up to the second predetermined energy value before allowing take-off of the vehicle. An example may be loading of the kinetic energy recuperation system to an energy level of 200 kJ in order to add 100 kW during 2 seconds to the take-off energy provided by the prime mover.

According to a second aspect a vehicle comprising a prime mover and a kinetic energy recuperation system is disclosed, such that said prime mover is adapted to propel the vehicle either alone or in combination with the kinetic energy recuperation system, which is operably coupled to the prime mover and to wheels of the vehicle is and adapted to store energy at times when there is an abundance of energy and to consume energy at times when there is a demand for energy, the vehicle being adapted to perform the inventive method.

According to one embodiment the kinetic energy recuperation system is a flywheel.

This is a type of kinetic energy recuperation system which is quickly loaded, i.e. which stores energy quickly, but which at the same time makes the energy available for consumption by the vehicle.

According to a third aspect a vehicle is disclosed in which the prime mover is an internal combustion engine.

BRIEF DESCRIPTION OF THE DRAWINGS

In the following the disclosure will be described in relation to a non-limiting embodiment with reference to the accompanying drawings, in which.

DETAILED DESCRIPTION

The disclosure starts with the description of the powertrain of a vehicle which utilises the present method, and continues with the description of the system and method as such.

A vehicle of the kind that is relevant for the present disclosure is any type of vehicle which may be propelled by a prime over. An example of such a vehicle is a truck, such as a heavy truck in cargo transport. Other types of vehicles may i.a. be any type of truck, bus or passenger car.

Figure 1A:
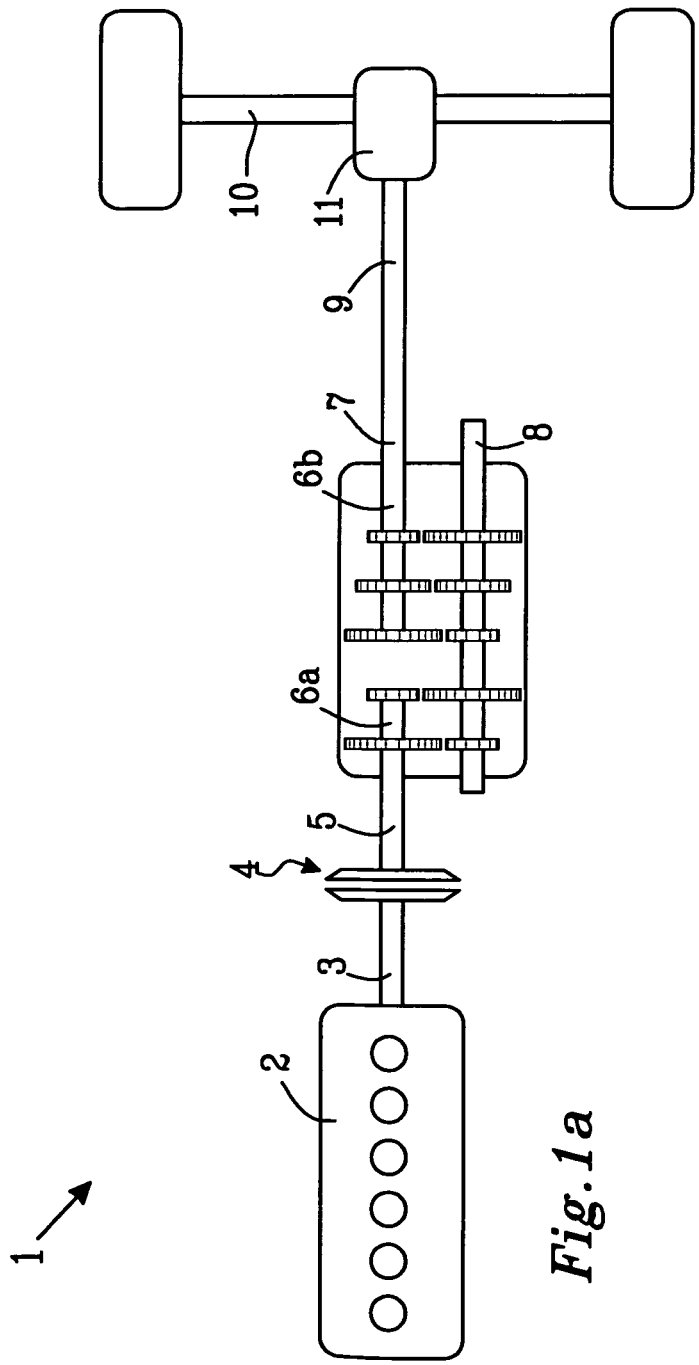
FIG. 1a is a schematical representation of a powertrain according to the disclosure, FIG. 1b schematical representation of a flywheel and continuously variable transmission according to the disclosure.

Starting with reference to FIG. 1a, a powertrain 1 in a vehicle which is suitable for performing the disclosed method includes an internal combustion engine 2, normally a diesel engine, which is of a generally known type. Internal combustion engines 2 running on other types of fuel are also possible, such as running on petrol, natural gas or dimethylether. Furthermore also other types of prime movers, such as electric machines etc. are well suitable. The internal combustion engine 2 is one embodiment of a prime mover. The internal combustion engine 2 has a crank shaft 3 which at one end is connected to a clutch 4. The clutch 4 is used to disengage the internal combustion engine 2 from the transmission. The clutch 4 is connected to an input shaft 5 to a gear box 6, which at an end opposite to the input shaft 5 has an output shaft 7. The gear box 6 may be of a generally known type of an Automated Mechanical Transmission (AMT) type of gear box. Normally such a gear box 6 is internally provided with a first shaft 6a which is the counterpart of the input shaft 5, a second shaft 6b which is the counterpart of the output shaft 7 and a counter shaft 8 which connects the first shaft 6a with the second shaft 6b and rotates in the opposite direction as to the first and the second shafts 6a and 6b. Some gear boxes of this type are not provided with a counter shaft 8. The output shaft 7 is in turn connected to a propeller shaft 9 and to the driving axle 10 of the vehicle through a differential 11.

Figure 1B:
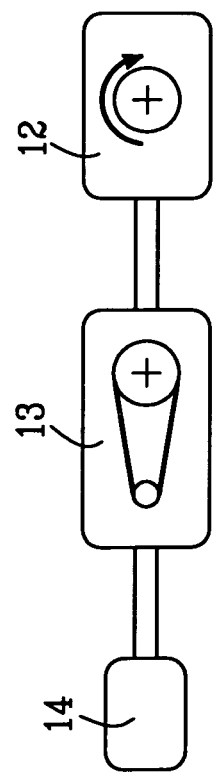

The powertrain 1 is accompanied with a flywheel 12. The flywheel is shown in FIG. 1b. The flywheel 12 is one embodiment of a kinetic energy recuperation system. The flywheel 12 is connected to the powertrain 1 through a continuously variable transmission (CVT) 13 at a powertrain interface and connection point 14 connected to the CVT 13. In order to connect the flywheel 12 to the powertrain 1 the rotational speed of the flywheel 12 is adapted to the rotational speed of the powertrain 1 at the connection point 14. This is achieved by the CVT 13. The flywheel 12 and the CVT 13 may be connected to the powertrain 1 at several connection points. The possible connection points are at the crank shaft 3 at the end of the internal combustion engine 2 which is located opposite to the clutch 4. Another possible connection point is at the input shaft 5 between the clutch 4 and the gear box 6. A further possible connection point is at the counter shaft 8, at the end of the counter shaft 8 which is located at the same side of the gear box 6 as the second shaft 6b and the output shaft 7. Further possible connection points include at the propeller shaft 9 and at the driving axle 10.

The flywheel 12 is a generally massive, well-balanced steel or composite cylinder which is suspended on a rotational axle through bearings (not shown). Other materials may be applied. The flywheel 12 has a significant moment of inertia. The flywheel 12 is contained in a housing which is able to maintain a general vacuum within it. Vacuum is created through a vacuum pump (not shown). The vacuum pump may either be integrated in the housing or be a separate entity. The rotational axle is connected to the CVT 13. The energy of the flywheel 12 is proportional to the square of the rotational speed, and energy may be stored therein and collected for consumption therefrom through applying a torque on the rotational axle 15, either to transfer the torque from the powertrain 1 to the flywheel 12 or to transfer the torque from the flywheel 12 to the powertrain 1.

The continuously variable transmission (CVT) 13 may be of an electric type comprising two electrical machines coupled in series, or it may be of a mechanical type with either a toroidal type of CVT or with fixed gears and slipping clutches. A typical flywheel 12 size in relation to an internal combustion engine 2 size is a 100 kW and 500 kJ flywheel in a city bus of 15 tonnes having an 8 liter turbo-charged diesel engine.

Figure 2:
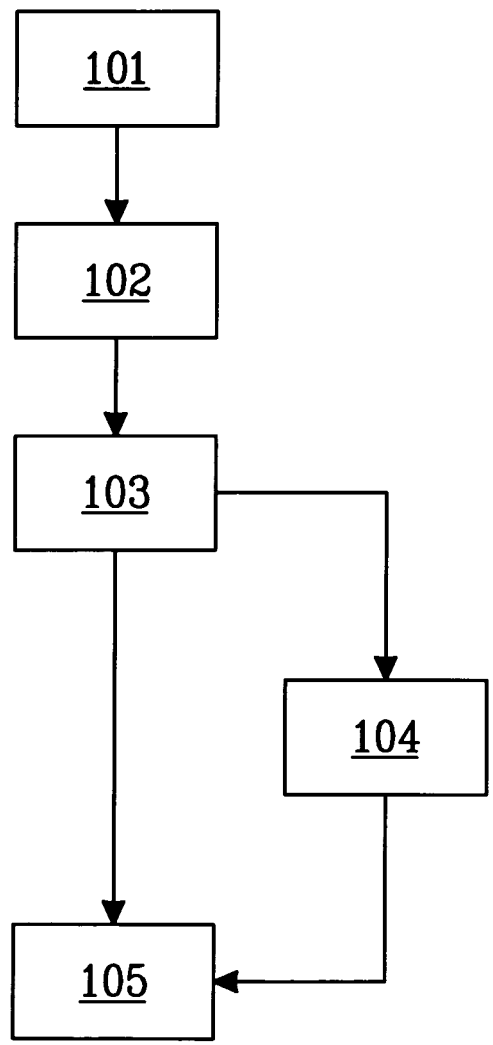
FIG. 2 is a flow-chart disclosing the method according to the disclosure.

The general function of the system of powertrain 1 and flywheel 12 will now be described in more detail with reference to FIG. 2. The vehicle may be propelled by the internal combustion engine 2 alone or in combination with the flywheel 12. The flywheel 12 alone cannot propel the vehicle in any commercially interesting way. The function of the flywheel 12 is to support the internal combustion engine 2 when found needed. This if the case when the level of energy in the flywheel 12 is found insufficient for propelling the vehicle to achieve to take-off. The internal combustion engine 2 is run in a generally known manner. Firstly, it is determined that the vehicle is standing still or essentially is standing still 101. When it is found that the flywheel 12 should be used to support the internal combustion engine 2, i.e. that a take-off assistance condition is detected 102, the flywheel 12 needs firstly to be loaded with energy if it is not already loaded. The level of energy in the flywheel 12 is thus detected 103. This may I.a. be done through measurement of the rotational speed thereof since the energy level is directly proportional to the rotational speed. If the level of energy is found insufficient, or according to another embodiment, is found below a first predetermined energy value, energy is stored in the flywheel 12; 104. The flywheel 12 may be loaded 104 by the internal combustion engine 2 to any extent between slightly more than no energy (0 rounds per minute (rpm) or 0% energy) and an energy level corresponding to its maximum rotational speed (maximum rpm or 100% energy). The energy needed to take off at a particular moment is generally determined by the prevailing conditions. Thereby the energy ratio is not fixed for a rake-off, but is adapted for each one. According to a preferred embodiment, the vehicle is allowed to take off even though there is not enough energy in the flywheel 12 for the take-off. As an alternative embodiment a predetermined ratio of energy in the flywheel 12 may be set in advance as a minimum energy ratio in the flywheel 12 before allowing the vehicle to take off. This minimum energy ratio is one embodiment of a second predetermined energy value. As such, there is no need in terms of the functionality of the present invention for the flywheel 12 to be fully loaded to initiate a vehicle take-off 105, unless the e.g. manufacturer or the owner of the vehicle decides so. A basic idea for a vehicle take-off to take place is merely that there is enough energy available in the internal combustion engine 2 and the flywheel 12 together, so that the vehicle may take off from a standstill 105 in a commercially interesting way. Since the energy available from the internal combustion engine 2 generally is fixed, it is the energy in the flywheel 12 that may be adapted. What may be determined as commercially interesting is generally up to the manufacturer or the owner/driver of the vehicle to decide.

The loading of energy of the flywheel 12 may be achieved at times when there is a surplus of energy for driving the vehicle. This may be during braking, during driving downhill or in any way freely rolling the vehicle. Loading of the flywheel 12 is accomplished by connecting the CVT 13 to the powertrain 1 such that energy may be transferred into the flywheel 12 to start its rotation. Particularly, the inventors of the present invention have realised that although the flywheel 12 possibly has not been loaded, in any of these manners that usually are utilised, there is a need to take off from a general standstill 101 and the internal combustion engine 2 is in need of the support 102 from the flywheel 12. The inventors of the present invention have thus found that it is advantageous to load the flywheel 12 by running the internal combustion engine 2 to achieve the additional take-off power that the flywheel 12 may support the internal combustion engine 2 with. This may at a first glance seem odd since the internal combustion engine 2 uses fuel to store energy in the flywheel 12, such that the energy later may be recovered to take-off from a standstill. However, the overall fuel consumption will be reduced since a smaller internal combustion engine 2 may be used, and not all times when a take-off is demanded by the driver the flywheel 12 will be completely empty. Rather the opposite. For a vehicle such as a bus which is used in i.a. commuting traffic which repeatedly stops and later again takes off from a standstill, the flywheel 12 will during most of its driven or used time be loaded to at least sonic degree. It will usually only be at rare occasions that such a vehicle has a completely empty flywheel 12.

As has already been discussed, according to an alternative embodiment the vehicle may be prohibited from taking off if it is found that there is not enough energy available in the internal combustion engine 2 and the flywheel 12 together. This is a deliberate choice. A take-off off prohibition will however not remain for a long time, since the flywheel 12 is quickly loaded by the internal combustion engine 2. In most cases the driver will not even notice that taking off has been prohibited by the inventive system. The vehicle is prohibited from taking off if the energy level in the flywheel 12 is found to be below the predetermined energy ratio or found too low in view of the prevailing conditions. The vehicle could however according to the preferred embodiment be forced to take off also with a downsized engine and no energy in the flywheel 12, but that would entail slipping of the clutch in a manner which is not feasible in terms of wear.

If the flywheel 12 is found to be loaded to a ratio between the predetermined energy ratio or the sufficient level in view of the prevailing condition and 100%, and a take-off condition is detected, the loading of the flywheel 12 by the internal combustion engine 2 is stopped and the vehicle is allowed to take off by utilising the energy in the flywheel 12 together with the internal combustion engine 2.

Some vehicles are provided with a start/stop functionality. This means that the internal combustion engine 2 is stopped at times when there is no need for such energy. A typical situation is when the vehicle is stopping at a traffic light or at a bus stop to let people off and on. If a vehicle has stopped and the internal combustion engine 2 is also stopped by such a start/stop functionality, while also detecting a take-off condition and that the flywheel 12 is needed to be loaded with energy, according to the present invention the internal combustion engine 2 is restarted so that it may load the flywheel 12. The present invention may consequently override a start/stop functionality in order to improve the vehicle startability.

Examples of take-off conditions are any one or a combination of the following: determining that the vehicle is standing, in or at an upward slope, determining that the vehicle is heavily loaded, or determining that the vehicle is being belated in relation to a desired schedule.

Determination of that the vehicle is standing in or at an upward slope may be achieved through the use of a vehicle navigation system such as a Global Positioning System (GPS) in combination with a map or similar database comprising topographical information, thereby knowing where the vehicle is presently located and its immediate conditions at its location or just in front of the vehicle. The geographical information in the GPS may either include topographical information or have such information in a parallel system. One alternative way to acquire topographical information is through driving a certain path and storing the information on a suitable medium in the vehicle.

Another manner to determine that the vehicle is standing in an upward slope is through the use of an inclination sensor. An inclination sensor is one embodiment of inclination detecting means. Such an inclination sensor may in principle be located at any point in the vehicle, but a advantageous location is at a point where there is little sway or wobble. This is generally found at a middle-point in the vehicle along its longitudinal as well as transversal direction.

Typical upward slopes for which take-off assistance may be needed from a flywheel 12 are slopes of more than 10% angle or more if driving a fully loaded city buss of 18 tonnes and having either an 8 liter turbo-charged diesel engine internal combustion engine 2 running on diesel fuel.

Determination of that the vehicle is heavily loaded may be achieved through the use of gauges that are connected directly to the wheel suspension and which measure the pressure and consequently the aggregate of dead weight and any added payload, i.e. the total weight of the vehicle. The dead weight of the vehicle is known, and by a determination of total weight of the vehicle and subtracting the known dead weight, the added payload may be estimated.

On a vehicle which is provided with an air-suspension bellows are located between the vehicle chassis and the wheel axles. The air pressure in these bellows may be measured through pressure sensors as a measure of vehicle weight and consequently of added payload. Although this method is simple, many vehicles are not provided with air-suspension. Instead a potentiometer or similar gauge may be located, against leaf springs or helical springs, which today represent the most common suspension type. Such potentiometers are simple yet robust and cheap gauges and provide an effective means for estimating payload.

The total weight of the vehicle, including the added payload, may be calculated through Newton's second law of motion: force equals mass multiplied by acceleration. The vehicle speed and acceleration are already known through other means in the control system of the vehicle. The road inclination may be known from an inclination sensor as already described. The effect delivered from the powertrain to the driven wheels may already be known through the control system of the vehicle. This method demands that the vehicle is driven to perform the calculation. It may take a short while to reach a stable value on the calculated total weight and consequently on the calculated payload. This method may also be used as complement to other known methods to perform accurate payload estimation.

Typical payloads of a vehicle may be 30% in relation to its dead weight. Other examples are 50% or 70%. Determination of that the vehicle is belated in relation to a desired schedule can be achieved through the use of a GPS in combination with memory means for keeping track of the intended or desired driving schedule. The desired driving schedule may be provided with desired vehicle location information at mile stones along a desired driving route, or as a more continuous desired driving route. If and when the vehicle is belated in relation to the desired schedule according to the desired driving route the method according to the invention may be engaged to release more energy such that the vehicle ma catch up in relation to the desired schedule.

It should be noted that a take-off assistance condition may include not only a single condition, such as standing in an upward slope. A take-off assistance condition may also involve several conditions simultaneously. A vehicle which is not so heavily loaded as to be detected as a take-off assistance condition may well be found so if the loading situation is combined with standing in or at an upward slope, even though the slope as such would not in itself fulfil the criteria for a take-off assistance condition. There may consequently be combination situations such that the level of energy is found lower than the first predetermined energy value due to more than one reason.

A take-off condition may be detected already at a point in time when the vehicle is slowing down to a halt. In such a case it is possible to load the flywheel 12 immediately if it is not properly loaded through the stopping itself and the accompanying energy recovery. Under such conditions there will not be any prohibition of the take-off when the vehicle is made to take off again, since the kinetic energy recuperation system is fully loaded, with energy. A take-off condition may also be detected after the vehicle has already stopped completely. Finally it may be detected when the driver of the vehicle is asking for a take-off through the use of the accelerator pedal. This is however less advantageous, since the take-off may be prohibited if the flywheel 12 is not suitably loaded. In such a case the internal combustion engine 2 must be run until the flywheel 12 is loaded to such an extent that a take-off is possible. Although this may be a short period, it might reduce the driveability of the vehicle. This is particularly true for a vehicle such as a city bus running against a desired schedule.

It should be noted that the loading of the flywheel 12 may be made through choosing optimum running conditions for the internal combustion engine 2 such that the lowest possible fuel consumption and/or the lowest possible exhaust gas emissions is achieved. During normal driving of the vehicle, the flywheel 12 may i.a. be loaded through the recovery of energy during braking. However, if the internal combustion engine 2 must be run for the single purpose of loading the flywheel for a take-off, it is vital that this is done as economical and efficient as possible.

The person skilled in the art will realise that many alterations and modifications ma be done to the present invention as disclosed hereinabove without deviating from the scope of protection of the appended claims. Different embodiments of the present inventions may be combined together in other ways than those described.

The invention claimed is:

1. A method for improving startability of a vehicle, the vehicle being provided with a prime mover and a kinetic energy recuperation system, such that the prime mover is adapted to propel the vehicle either alone or in combination with the kinetic energy recuperation system which is operably coupled to the prime mover and to wheels of the vehicle and is adapted to store energy at times when there is an abundance of energy and to use energy at times when there is a demand for energy, the method comprising the steps of:
   a. determining that the vehicle is standing still,
   b. detecting a take-off assistance condition,
   c. detecting a level of energy in the kinetic energy recuperation system,
   d. determining that a level of energy is insufficient and connecting the prime mover to the kinetic energy recuperation system and running the prime mover such that energy from the prime mover is stored in the kinetic energy recuperation system, and
   e. requesting the vehicle to take off and running the prime mover and consuming energy from the kinetic energy recuperation system such that the wheels of the vehicle initiate propelling thereof.

2. A method according to claim 1, in which the step of finding the level of energy insufficient involves finding that the level of energy is lower than a first predetermined energy value.

3. A method according to claim 2, if the level of energy is lower than the first predetermined energy value, the method further includes detecting whether the prime mover is running, and if it is not, starting up the prime mover.

4. A method according to claim 1, in which the vehicle is provided with a start/stop function, such that if a take-off assistance condition is detected and if the vehicle is standing still, the start/stop function is disabled from stopping the prime mover from running.

5. A method according to claim 1, comprising perform the steps in an order of, first, a., second, b., third, c., fourth, d., and, fifth, e.

6. A method according to claim 1, in which the step of determining the take-off assistance condition includes any one or a combination of the following: determining that the vehicle is standing in or at an upward slope, determining that the vehicle is loaded, or determining that the vehicle is being belated in relation to a desired schedule.

7. A method according to claim 1, wherein the step of determining the take-off assistance condition includes determining that the vehicle is standing in or at an upward slope using inclination detecting means and determining if that the inclination detecting means detect an upwards slope being equal to or greater than a predetermined inclination value.

8. A method according to claim 7, in which the predetermined inclination value corresponds to an upward slope of at least 7.5%.

9. A method according to claim 1, wherein the step of determining the take-off assistance condition includes determining that the vehicle is loaded weight sensing means and determining that the weight sensing means detect a payload in the vehicle being equal or greater than a predetermined weight value.

10. A method according to claim 9, in which the predetermined weight value corresponds to a payload of at least 30% in relation to a vehicle dead weight.

11. A method according to claim 1, in which the method further comprises prohibiting propelling the vehicle until the level of energy in the kinetic energy recuperation system is equal to or greater than a second predetermined energy value.

12. A vehicle comprising a prime mover and a kinetic energy recuperation system, such that the prime mover is adapted to propel the vehicle either alone or in combination with the kinetic energy recuperation system which is operably coupled to the prime mover and to wheels of the vehicle and is adapted to store energy at times when there is an abundance of energy and to consume energy at times when there is a demand for energy, the vehicle being configured to perform a method for improving startability of the vehicle, the vehicle being provided with a prime mover and a kinetic energy recuperation system, such that the prime mover is adapted to propel the vehicle either alone or in combination with the kinetic energy recuperation system which is operably coupled to the prime mover and to wheels of the vehicle and is adapted to store energy at times when there is an abundance of energy and to use energy at times when there is a demand for energy, the method comprising the steps of:

determining that the vehicle is standing still, detecting a take-off assistance condition, detecting a level of energy in the kinetic energy recuperation system, determining that a level of energy is found insufficient and connecting the prime mover to the kinetic energy recuperation system and running the prime mover such that energy from the prime mover is stored in the kinetic energy recuperation system, and requesting the vehicle to take off and running the prime mover and consuming energy from the kinetic energy recuperation system such that the wheels of the vehicle initiate propelling thereof.

13. A vehicle according to claim 12, in which the kinetic energy recuperation system is a flywheel.

14. A vehicle according to claim 12, in which the prime mover is an internal combustion engine.

* * * * *

UNITED STATES PATENT AND TRADEMARK OFFICE
CERTIFICATE OF CORRECTION

PATENT NO. : 9,738,282 B2  
APPLICATION NO. : 14/766765  
DATED : August 22, 2017  
INVENTOR(S) : Mattias Åsbogård et al.

Page 1 of 1

It is certified that error appears in the above-identified patent and that said Letters Patent is hereby corrected as shown below:

On the Title Page

Item (72) first listed inventor's name incorrectly spelled as "Ásbogård" and should be spelled as --Åsbogård--.

Signed and Sealed this  
Fifth Day of June, 2018

Andrei Iancu  
*Director of the United States Patent and Trademark Office*